Figure 1:
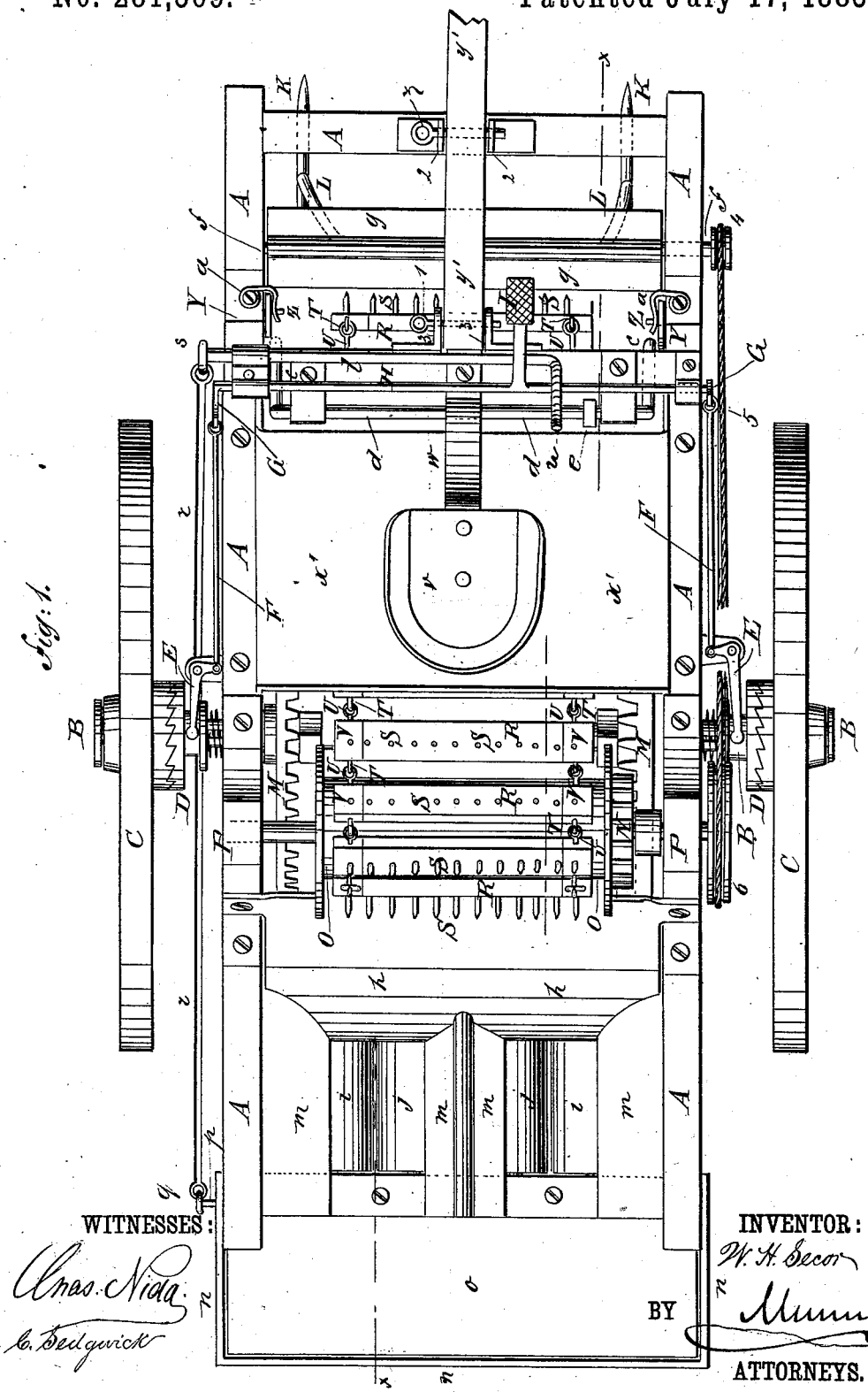

(Model.)

3 Sheets—Sheet 1.

W. H. SECOR.
COMBINED CORN HARVESTER AND HUSKER.

No. 281,569. Patented July 17, 1883.

WITNESSES:
Chas. Nida
C. Sedgwick

INVENTOR:
W. H. Secor
BY Munn & Co.
ATTORNEYS.

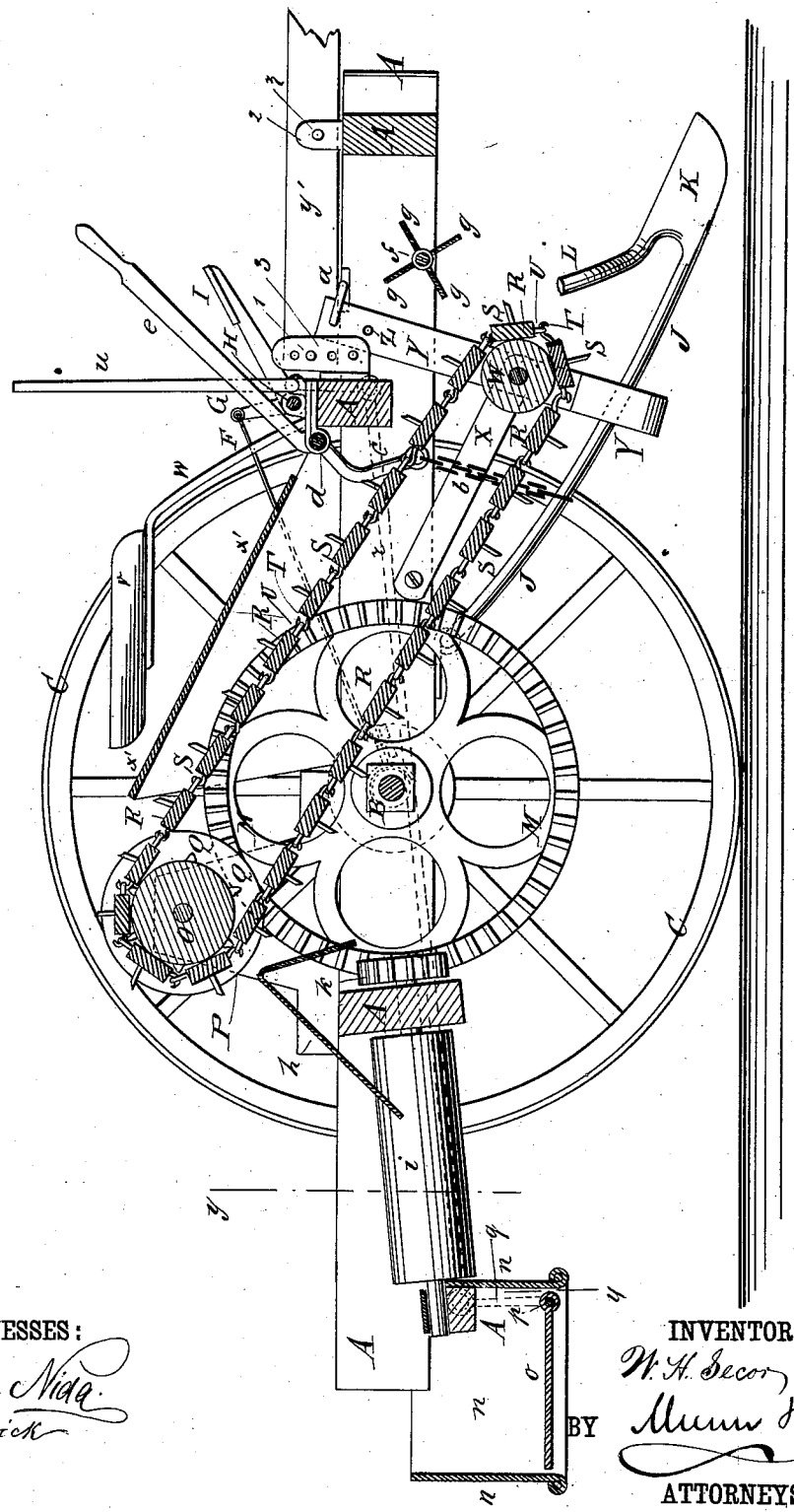

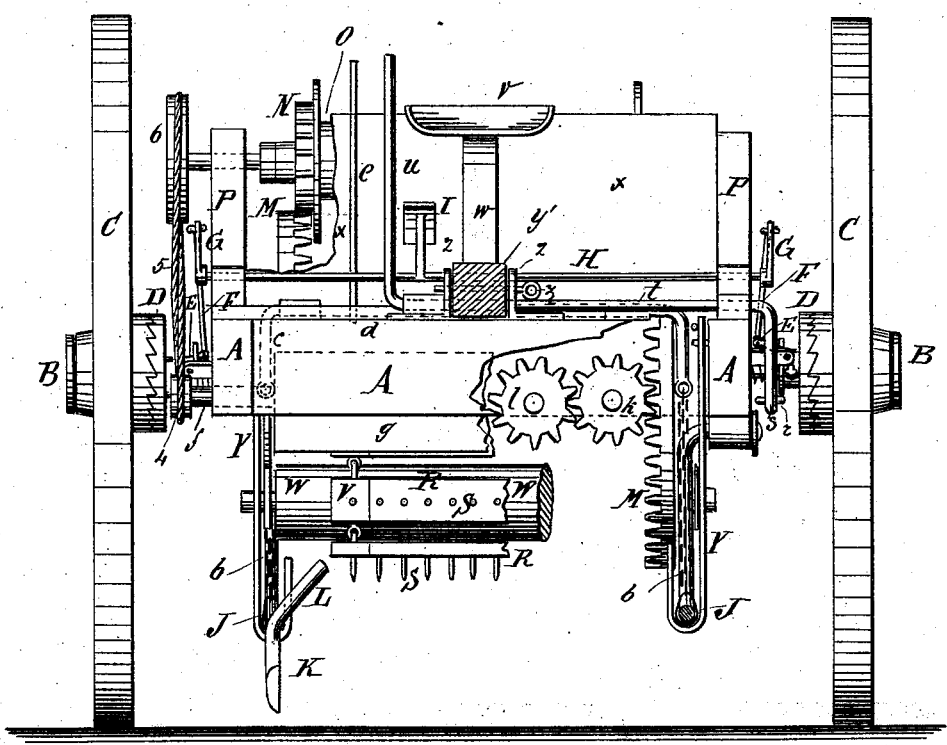

UNITED STATES PATENT OFFICE.

WILLIAM H. SECOR, OF FARRAGUT, IOWA, ASSIGNOR OF ONE-THIRD TO SIMON CROSSER AND HARRISON ROGERS, BOTH OF SAME PLACE.

COMBINED CORN HARVESTER AND HUSKER.

SPECIFICATION forming part of Letters Patent No. 281,569, dated July 17, 1883.

Application filed January 22, 1883. (Model.)

*To all whom it may concern:*

Be it known that I, WILLIAM HASCLE SECOR, of Farragut, in the county of Fremont and State of Iowa, have invented certain new and useful Improvements in Combined Harvester and Husker, of which the following is a full, clear, and exact description.

Reference is to be had to the accompanying drawings, forming a part of this specification, in which similar letters of reference indicate corresponding parts in all the figures.

Figure 1, Sheet 1, is a plan view of my improvement. Fig. 2, Sheet 2, is a sectional side elevation of the same, taken through the broken line $x$ $x$, Fig. 1. Fig. 3, Sheet 3, is a front elevation of the same, parts being broken away. Fig. 4, Sheet 3, is a sectional front elevation of the same, taken through the line $y$ $y$, Fig. 2.

The object of this invention is to facilitate the husking of corn from stalks standing in the field; and to this end the invention consists in the peculiar construction and arrangement of parts, as hereinafter fully described, and pointed out in the claims.

A is the frame of the machine, to the side bars of which, a little in the rear of their centers, are attached bearings in which revolve the axle B. The wheels C have clutch-teeth formed upon or attached to the inner ends of their hubs to engage with the teeth of the clutches D, which are connected with the axle B by tongues and grooves or other suitable means, so that the said clutches will carry the said axle with them in their revolution as they are revolved by the revolution of the said wheels C. In the clutches D are formed annular grooves to receive the forked ends of the long arms of the elbow-levers E, which are pivoted at their angles to supports attached to the side bars of the frame A.

To the ends of the short arms of the elbow-levers E are pivoted the rear ends of the connecting-rods F, the forward ends of which are pivoted to crank-arms G, formed upon or attached to the ends of a shaft or rod, H. The shaft H rocks in bearings attached to the frame A, and to it is attached the end of the hand or foot lever I, which projects upward into such a position that it can be readily reached and operated by the driver from his seat.

To the under side of the side bars of the frame A, a little in front of the axle B, are hinged the rear ends of two or more bars, J, to the forward ends of which are attached, or upon them are formed, shoes K, to rest and slide upon the ground. The lower sides of the forward ends of the shoes K are rounded or beveled, to cause the said shoes to slide over the ground readily, and to pass beneath and raise stalks that may be bent or lying down, and bring the said stalks into proper position to be operated upon by the machine, as will be hereinafter described.

Upon the upper part of the rear ends of the shoes K are formed, or to them are attached, arms L, which incline upward and inward, as shown in Figs. 2 and 3, to guide the stalks toward the middle part of the machine, and thus bring them into proper position to be operated upon by the teeth of the elevator.

To the axle B, at the inner sides of the side bars of the frame A, are attached two large gear-wheels, M, the teeth of one of which mesh into the teeth of a small gear-wheel, N, attached to the end of the roller O. The roller O revolves in bearings in standards P, attached to the side bars of the frame A, and is provided with pins or teeth Q, to engage with the cross-bars R of the endless-chain elevator, so that the said elevator will be driven by the revolution of the said roller O. The cross-bars R are provided with teeth S, and have hooks T at one side of their ends, and eyes U at the other sides of the said ends, so that the hooks T of one bar will engage with the eyes U of the next adjacent bar, thus forming an endless chain of toothed bars. The ends of the cross-bars R are strengthened by metal bands V. The endless chain of the elevator is placed in an inclined position, and its lower forward part passes around a roller, W, the journals of which revolve in bearings in the forward ends of the bars X, the rear ends of which are hinged to the side bars of the frame A by bolts or other suitable means, so that the forward part of the elevator can be readily raised and lowered. The journals of the roller W also revolve in bearings in the bars Y, the upper ends of which have holes formed in them to receive pins Z, attached to the side bars of the frame A. The bars Y can have several holes formed through them to receive the pins Z, so that they can be adjusted higher or lower to raise and lower the forward part of the elevator, as may be required. The upper ends of the bars Y are kept in place upon the pins Z by hooks $a$, pivoted to the upper sides of the side bars of the frame A, and hooking around the ends of the said bars. The bars Y project below the roller W, and their lower ends are curved upward into U form to receive and serve as guides to the shoe-carrying bars J, and as stops to limit the downward movement of the said bars and prevent them from dropping too far below the lower end of the elevator. The bars J pass through links in the lower ends of the chains $b$, or are otherwise connected with the said chains. The upper ends of the chains $b$ are attached to crank-arms $c$, formed upon or attached to the shaft $d$, which rocks in bearings attached to the frame A. To the shaft $d$ is attached, or upon it is formed, a lever, $e$, so that the bars J and the shoes K can be readily raised when desired.

Above and a little in front of the forward end of the elevator is placed a shaft, $f$, the journals of which revolve in bearings attached to the side bars of the frame A. To the shaft $f$ are attached four radial wings, $g$, (more or less), which are designed to break off the ears of corn against the forward end of the elevator as the machine is drawn against the cornstalks, so that the said ears will be carried up the elevator, while the stalks are left standing in the ground.

To one of the journals of the winged shaft $f$ is attached a small pulley or chain-wheel, 4, around which passes an endless band or chain, 5. The band or chain 5 also passes around a larger pulley or chain-wheel, 6, attached to a journal of the upper elevator-roller, O, so that the winged shaft $f$ will be driven from the said roller. As the ears of corn are carried over the upper roller, O, they fall upon the inclined apron $h$, attached to the standards P, and slide down the said apron to the rollers $i\,j$, which are arranged in pairs, and are journaled to the cross-bars of the frame A, with their rear ends inclined downward. The forward journal of the outer roller, $i$, of each pair projects, and to it is attached a gear-wheel, $k$, the teeth of which mesh into the teeth of the large gear-wheel, M, so that the rollers $i$ will be revolved by the revolution of the gear-wheel M. The teeth of the gear-wheels $k$ mesh into the teeth of the gear-wheels $l$, attached to the forwardly-projecting journals of the inner rollers, $j$, and which are made of the same size as the gear-wheels $k$, so that the rollers $i\,j$ of each pair will be revolved toward each other and at the same speed. The outer parts of the upper sides of the rollers $i\,j$ are covered by inclined guards $m$, to keep the ears of corn in the spaces between the said rollers, as shown in Figs. 1 and 4. One or more pairs of rollers, $i\,j$, can be used, as may be desired. With this construction, as the ears of corn slide down the space between the rollers $i\,j$, the husks are caught by the said rollers, drawn from the ears, and dropped to the ground, the space between the said rollers not being sufficient to allow the ears to pass through. The inner rollers, $j$, may revolve in sliding bearings held forward by springs, so that the rollers $i\,j$ can adjust themselves to the thickness of the husks passing between the said rollers. At the lower ends of the rollers $i\,j$ the husked ears fall into the box $n$, secured to the rear cross-bar of the frame A. The bottom $o$ of the box $n$ is movable, and is attached at its forward edge to the rod $p$, which rocks in bearings in the lower forward parts of the ends of the box $n$. One end of the hinging-rod $p$ projects, and to it is rigidly attached an upwardly-projecting crank-arm, $q$, to the upper end of which is hinged the rear end of a connecting-rod, $r$. The forward end of the connecting-rod $r$ is hinged to a crank-arm, $s$, formed upon or attached to the end of a shaft, $t$, which rocks in bearings attached to the frame A, and to which is rigidly attached an upwardly-projecting lever, $u$, so that by operating the said lever the bottom $o$ of the receiving-box $n$ can be tilted to drop the collected ears to the ground in heaps.

The levers I $e\,u$ are designed to be provided in the ordinary manner with catch-bars, to hold them in any position into which they may be adjusted, but which are not shown in the drawings.

$v$ is the driver's seat, which is attached to the upper end of the spring-standard $w$. The lower end of the spring-standard $w$ is attached to the frame A. The part of the endless-chain elevator beneath and adjacent to the driver's seat $v$ is covered with a casing, $x'$, to prevent the driver and his clothing from being injured by the said elevator.

$y'$ is the tongue to which the draft is applied, and by which the machine is guided and controlled. The tongue $y'$ is secured by two pins or bolts, $z$ 1, to two pairs of lugs, 2 3, secured to the forward cross-bars of the frame A. The rear lugs, 3, have a number of holes formed through them to receive the pin 1, so that the forward end of the machine can be adjusted higher or lower, as may be required.

Having thus fully described my invention, I claim as new and desire to secure by Letters Patent—

1. In a corn-harvester, the combination, with the guide-rods J K L, constructed as described, the winged shaft $f\,g$, and the elevator R S, of one or more pairs of inclined rollers, $i\,j$, journaled in the rear part of the frame, substantially as herein shown and described.

2. In a corn-harvester, the combination, with the frame A, of the bars J, hinged at their rear ends to the frame, and provided with the shoes K and upwardly and inwardly inclined arms L on their forward ends, substantially as herein shown and described.

3. In a corn-harvester, the combination, with the frame A and the hinged rods J, carrying the shoes K and guide-arms L, of the adjustable guide-bars Y, substantially as herein shown and described, whereby the said guide-rods and their shoes are kept in proper position, as set forth.

4. In a corn harvester and husker, the combination, with the frame A and axle B, of the endless chain of toothed bars R, the rollers O W, the driving-gearing M N, and the supporting-bars X Y, substantially as herein shown and described, whereby the ears of corn can be automatically raised to a suitable height, as set forth.

5. In a corn harvester and husker, the combination, with the frame A and the axle B, provided with the gear-wheel M, of the roller O, provided with the gear-wheel N and pulley 6, the endless carrier R S, the winged shaft $f\ g$, provided with the pulley 4, and the band 5, substantially as herein shown and described.

WILLIAM HASCLE SECOR.

Witnesses:
HARRISON ROGERS,
JOSEPH SIKES.